United States Patent
Biegelsen et al.

(10) Patent No.: US 11,148,070 B2
(45) Date of Patent: Oct. 19, 2021

(54) SYSTEMS AND METHODS OF NANOFILTRATION USING GRAPHENE OXIDE

(71) Applicant: PALO ALTO RESEARCH CENTER INCORPORATED, Palo Alto, CA (US)

(72) Inventors: David K. Biegelsen, Portola Valley, CA (US); Armin R. Volkel, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 395 days.

(21) Appl. No.: 15/914,993

(22) Filed: Mar. 7, 2018

(65) Prior Publication Data

US 2019/0275444 A1    Sep. 12, 2019

(51) Int. Cl.

| | | |
|---|---|---|
| *B01D 15/02* | (2006.01) | |
| *B82Y 15/00* | (2011.01) | |
| *B01D 33/80* | (2006.01) | |
| *B01D 65/00* | (2006.01) | |
| *B01D 71/02* | (2006.01) | |
| *B01D 69/10* | (2006.01) | |
| *B01D 63/08* | (2006.01) | |
| *B01D 61/02* | (2006.01) | |

(52) U.S. Cl.
CPC .......... *B01D 15/02* (2013.01); *B01D 33/801* (2013.01); *B01D 63/087* (2013.01); *B01D 65/003* (2013.01); *B01D 69/10* (2013.01); *B01D 71/021* (2013.01); *B01D 61/027* (2013.01); *B01D 2239/1208* (2013.01); *B01D 2251/602* (2013.01); *B82Y 15/00* (2013.01)

(58) Field of Classification Search
CPC combination set(s) only.
See application file for complete search history.

(56) References Cited

U.S. PATENT DOCUMENTS

| 4,069,150 A | * | 1/1978 | Lodholz | B01D 21/06 |
| | | | | 210/112 |
| 4,203,465 A | * | 5/1980 | Rissi | F02M 65/00 |
| | | | | 137/487.5 |
| 5,221,468 A | * | 6/1993 | Fox | B01D 29/605 |
| | | | | 210/97 |

(Continued)

OTHER PUBLICATIONS

Cheng, Chi, et al., Ion transport in complex layered graphene-based membranes with tuneable interlayer spacing, 2016, Science Advances, vol. 2 No. 2, (Year: 2016).*

(Continued)

*Primary Examiner* — Bradley R Spies
*Assistant Examiner* — Jeannie McDermott
(74) *Attorney, Agent, or Firm* — Miller Nash LLP (57) ABSTRACT

Nanofiltration of aqueous solutions or other water-based fluids in various applications, such as desalination, dialysis, seawater purification, for example, may be enhanced through precisely controlling a filtration cutoff within graphene oxide nanofilters. By initially compressing and constraining the stacked thickness of multiple graphene oxide layers deposited between porous substrates, the interlayer gap size, and thus, the filtration cutoff may be adjusted and optimized.

12 Claims, 6 Drawing Sheets

(56) References Cited

U.S. PATENT DOCUMENTS

| | | | |
|---|---|---|---|
| 2005/0076484 A1* | 4/2005 | Sussenbach | F16B 21/186 24/662 |
| 2012/0150466 A1* | 6/2012 | Linn | G01N 29/265 702/65 |
| 2016/0218641 A1* | 7/2016 | Yu | H02N 2/101 |
| 2016/0311696 A1* | 10/2016 | Rock | C02F 1/004 |
| 2017/0296979 A1* | 10/2017 | Swett | B32B 27/40 |
| 2020/0016542 A1* | 1/2020 | Han | B01D 63/08 |

OTHER PUBLICATIONS

Abraham, Jijo, Tuneable Sieving of Ions Using Graphene Oxide Membranes, Apr. 2017, Nature Nanotechnology, vol. 12 Issue 6, p. 546. (Year: 2017).*

Joshi et al., "Precise and Ultrafast Molecular Sieving Through Graphene Oxide Membranes," Science, Feb. 14, 2014, vol. 343, Issue 6172, pp. 752-754, 23 pages.

* cited by examiner

SYSTEMS AND METHODS OF NANOFILTRATION USING GRAPHENE OXIDE

TECHNICAL FIELD

The disclosed technology relates generally to the field of filtration and, more particularly, to methods of nanofiltration.

BACKGROUND

Many methods have been used for nanofiltration and desalination, including membrane filtration using polymer thin films with track-etched pores created through bombardment or using aluminum oxide layers produced electrochemically and etched to a desired porosity. Major drawbacks in nanofiltration include the expense of initially creating the nanofilters, the limited use of the membranes and their susceptibility to fouling, as well as the energy (i.e., heating, cooling, and/or water pressure) requirements of the process.

Thin film composite membranes allow optimization of nanofiltration through careful selection of the permeability of each individual layer through varying the membrane layer material. However, increased fluid pressure due to flow through the thin film composite membranes tend to compact the varying material layers, thus altering their carefully chosen porosity, undermining the molecular size cutoff for the filtration module.

Filtering aqueous solutions and other water-based fluids for purposes, such as dialysis and seawater purification, for example, could be greatly enhanced if a precise filtration cutoff could be easily tuned. Many filters and other separation devices have an allowable threshold (i.e., filtration cutoff) for the size of molecules able to pass through the filter without being caught or otherwise stopped. This threshold can have a wide range depending on the filter type.

On the nanoscale level, most conventional filtration is limited to membrane filtration, which uses particularly sized pores to limit the molecules passing through the membrane. The specific filtration application both guides and limits the selection and design of the porosity and filtration cutoff for the membranes. The filtration cutoff for membrane filters may only be as precise as the pore creation process allows. For example, membranes created through interfacial polymerization are inexpensive, but have a wider than desirable pore size distribution. Then, once the pores are created in the membrane, their size is fixed and cannot easily be adjusted. Further, the membranes themselves may be susceptible to leaks or tears over time, which destroys the initial filtration cutoff.

Therefore, in order to provide greater precision and flexibility in nanofiltration and desalination systems, new membrane designs are needed, which include sharper filtration cutoffs and modularity for multiple applications. Research on the permeability of graphene oxide films has shown that graphene oxide laminates do not readily permeate ions and molecules with hydrated radii beyond an acceptable range.

SUMMARY

According to aspects of the present disclosure, a nanofilter may comprise graphene oxide layers deposited between first and second porous plates, between which a distance or pressure may be set by an adjusting control based on a desired filtration cutoff. Methods of nanofiltration may include flowing a feed liquid past a nanofilter with an adjusting controller for defining a hydrated diameter cutoff using graphene oxide layers and collecting the filtrate. Further, nanofiltration systems may include an adjustable graphene oxide filter and a tangential flow arrangement.

DETAILED DESCRIPTION OF THE EMBODIMENTS

The present disclosure describes structures and methods for setting and adjusting filtration cutoffs for the maximum molecule size allowed to permeate within filters made in bulk using deposited graphene oxide layers. The initial setup of these nanofilters includes compressing and constraining the graphene oxide layers to control their swelling in water, thereby governing the effective channel size of the nanofilter. The flexibility of the filtration cutoff within the graphene oxide filters enables arbitrary filtration processes, which would otherwise each require their own specially made filter or membrane with a fixed porosity having only one specific filtration cutoff range that more rapidly degrades due to fouling or enlarging, eroding wear on the pores.

In addition to sharp filtration cutoff limits, graphene oxide laminates have exhibited unique capillary pressure characteristics for aqueous solutions and other water-based fluids. Without being limited to theory, it is believed that stacked layers of graphene oxide form pristine regions of capillaries, which allow near frictionless flow of water through the graphene oxide layers. Ions present in the water are drawn into the graphene oxide capillaries due to a force gradient caused by the energy gain in interactions between the ions and the graphene walls. The graphene oxide capillaries rapidly transport molecules with molecular or hydrated radii that can fit within the capillaries' width. The hydrated radius for an ion is the effective radius of the ion and its waters of hydration. Thus, the size of the capillaries within the graphene oxide layers controls the size of the molecules able to permeate the stacked layers (i.e., a filtration cutoff).

Figure 1:
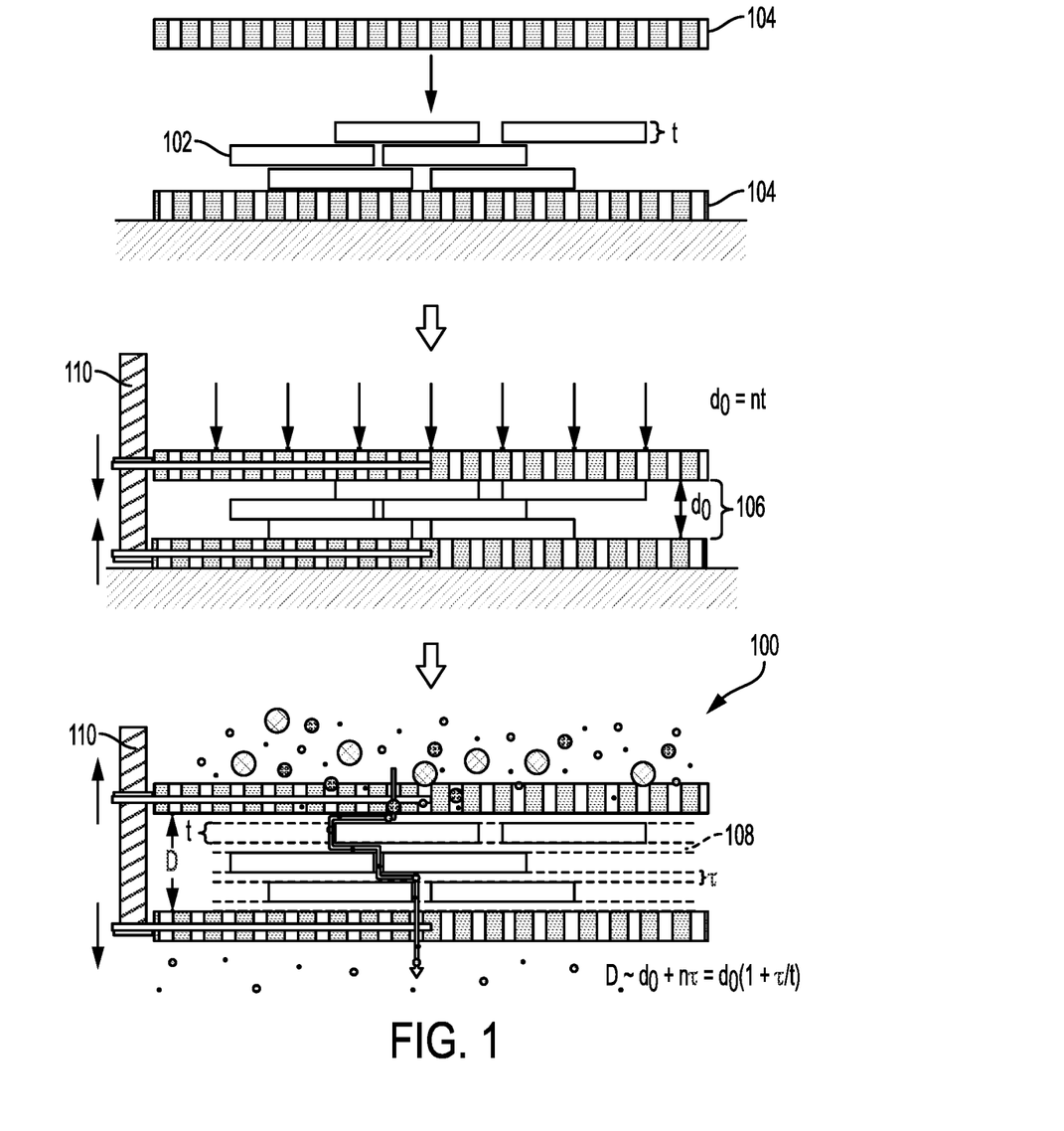
FIG. 1 is a cross-sectional side view of an example process of making and using a graphene oxide nanofilter, in accordance with certain embodiments of the disclosed technology.

As illustrated in FIG. 1, the effective cross-section or width of the graphene oxide capillaries is correlated to an interlayer gap size 108 between the stacked graphene oxide layers 102. Mechanically or otherwise constraining the swelling of the stack of graphene oxide layers 102 when immersed in water may control the interlayer gap size 108. Thus, the constraint placed on the stack thickness of the deposited graphene oxide layers 102 directly controls the interlayer gap size 108 and thereby the filtration cutoff for molecules able to rapidly pass through the graphene oxide capillaries.

FIG. 1 illustrates example assembly steps for making nanofilters in accordance with some embodiments of the disclosure. First, graphene oxide layers 102 with a layer thickness t are deposited or stacked onto a porous substrate 104. As a non-limiting example, the graphene oxide layers 102 may be deposited to a desired stack thickness of between about 0.1 µm and about 10 µm. The graphene oxide layers may be formed in various ways, such as by using graphene oxide flakes with a lateral extent from about 1 µm to about 100 µm or graphene oxide paper, for example. In some embodiments, the graphene oxide layers are formed through deposition using vacuum filtration and/or precipitation. In other embodiments, the graphene oxide layers may be formed using graphene oxide synthesis methods, such as the Tang-Lau method, for example. Additionally, various components and/or materials may provide the flat surface, rigidity, and controlled pore size of the porous substrate 104, acting as a coarse filter relative to the channel size of the graphene oxide layers, yet with small pores relative to the diameter of graphene oxide flakes, for example. In some embodiments, the porous substrate may be a filter sold under the trademark ANOPORE by Whatman International Ltd., or another anode etched aluminum oxide with a smooth surface or film, having an effective pore size of about 10 nm to about 100 nm. Alternatively, the porous substrate may have a pore size of about 2 µm or less, as discussed below in relation to FIG. 2.

Next, another porous substrate 104 may be placed atop the graphene oxide layers 102. In some embodiments the top porous substrate may be a filter sold under the trademark ANOPORE by Whatman International Ltd., or other smooth surface with smaller pore sizes, while the bottom porous substrate is rougher with larger pore sizes. The two porous substrates 104 may sandwich the graphene oxide layers 102 as the graphene oxide layers 102 are compressed to a minimum thickness do, such that a separation distance 106 between the top and bottom porous substrates 104 (i.e., the stack thickness of the graphene oxide layers 102) is reduced to a width within the elastic regime of the material's stress-strain curve before the yield point, approaching incompressibility.

Once reached, the minimum thickness do of the graphene oxide layers 102 may be measured using techniques, such as interferometry or sensing translational and/or rotational positions of fine pitch screws, inch worm piezo actuators, and/or springs, for example. Measuring the minimum thickness do may enable the calculation of the effective number of graphene oxide layers 102 based on the known layer thickness t, using the formula:

$$d_0 = nt$$

where n is the number of graphene oxide layers and t is the known thickness of one graphene oxide layer. The number of graphene oxide layers n may allow for the interpolation of the interlayer gap size 108 based on the separation distance 106 set and/or adjusted once the graphene oxide layers 102 are immersed in water, using the formula:

$$D \sim n(t+\tau) = d_0 + n\tau = d_0(1+\tau/t)$$

where D is the set separation distance 106 and τ is the effective interlayer gap size 108. Without being bound to theory, it is believed that the effective spacing τ may approximate the actual interlayer gap size because the acting intercalation forces tend to equalize the interlayer gap spacings between the graphene oxide layers.

There are many ways to mechanically constrain the deposited graphene oxide layers 102 during the initial compression to the minimum thickness do of the graphene oxide layers 102 and/or during adjustment to the separation distance 106 while the graphene oxide layers 102 are immersed in water. In some embodiments, the graphene oxide layers 102 may be compressed using an adjusting control 110 controlling a vice or clamping action on support rods inserted into the porous substrates 104, as shown in FIG. 1. In other embodiments, graphene oxide layers may be compressed between porous support plates, as discussed below and shown in FIG. 2. The separation distance 106 between the porous substrates 104 is proportional to the amount of space the graphene oxide layers 102 are permitted to occupy, and thus, their interlayer gap size 108.

The separation distance 106 between the porous substrates 104 may be precisely set or adjusted using the adjusting control 110 in a variety of ways. In some embodiments, fine pitch screws directly or indirectly connect the porous substrates and may precisely control their relative lateral movement. In other embodiments, inch worm piezo actuation may control the separation distance between the porous substrates. In yet other embodiments, spring mounts and/or pneumatic action may control the pressure applied to the porous substrates and thereby regulate the separation distance. Although not illustrated, there may be additional sensors used with the nanofilter to measure the actual separation distance. This separation distance data may be used by a controller to account for hysteresis, deformation, and/or wear in the nanofilter and/or mechanical constraint device used to set the separation distance.

As illustrated in FIG. 1, the set interlayer gap size 108 may control the filtration cutoff in the nanofiltration module or nanofilter 100 for regulating which molecules may permeate through to the bottom porous substrate 104. There are varying ways to determine which separation distance 106 should be used to set the desired interlayer gap size 108 of the nanofilter 100 alternatively or in addition to calculating the number of graphene oxide layers described above. Due to the varying degrees and types of structural changes to graphite during synthesis of graphite oxide, the filtration cutoff response to changes in the separation distance may fluctuate depending on the particular synthesis method and/or deposition method chosen. For this reason, it may be advantageous to test a nanofilter across a range of separation distances to empirically determine the correlation between the separation distance, interlayer gap size, and/or filtration cutoff. During nanofilter testing, the observed filtration cutoffs may be mapped to specific separation distances or ranges of separation distances. These sets of separation distances may be programmed into a controller and/or associated memory, such as shown in FIG. 2 as controller 212, for easily recalling different filtration cutoff states within the nanofilter or nanofiltration module.

Figure 2:
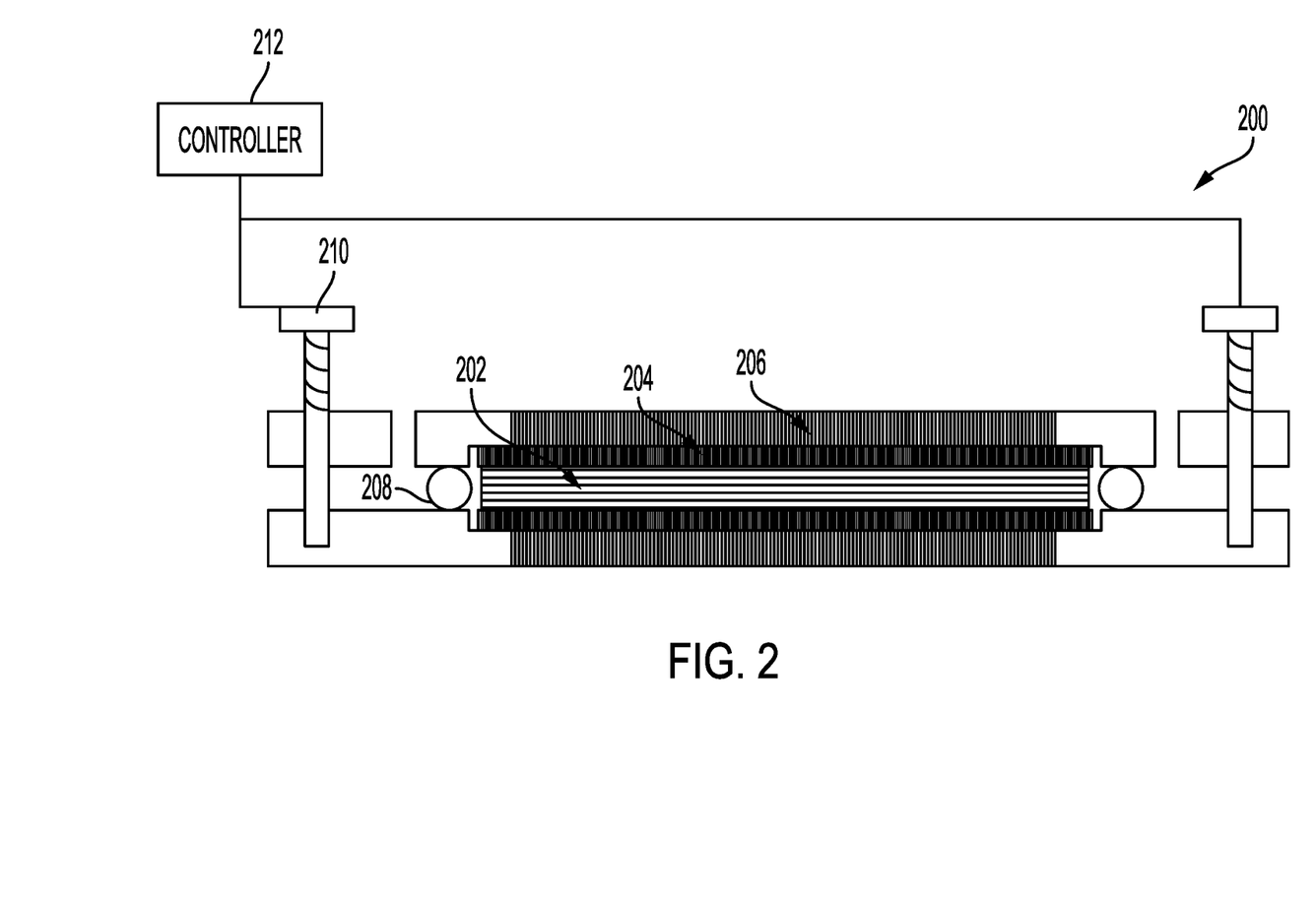
FIG. 2 is a cross-sectional side view of an example graphene oxide nanofilter with an adjusting control for setting an interlayer gap size, in accordance with certain embodiments of the disclosed technology.

FIG. 2 illustrates another example nanofiltration module or nanofilter 200 for adjustably setting the filtration cutoff in varying filtration systems and/or applications. The nanofilter 200 includes an adjusting control 210 for setting the separation distance between two porous support plates 206. As discussed above, the controller 212 may control the adjusting control. The porous support plates 206 may have a rougher surface and larger pore size, as discussed above. Sealed with an o-ring 208, the porous support plates 206 may surround secondary filters 204, which sandwich the central graphene oxide layers 202. Although shown as an o-ring, the o-ring 208 may be any type of seal or sealing material for laterally sealing the adjustable interlayer gap zone that includes the graphene oxide layers. The secondary filters 204 may be filters sold under the trademark ANOP-ORE by Whatman International Ltd., and/or other smooth surfaced media with a smaller pore size, as described above. The secondary filters 204 may provide a preliminary filtration cutoff, while the porous support plates 206 provide both structural strength and permeability. Using combined layers of porous support plates and secondary filters with a smaller pore size may advantageously reduce materials costs by minimizing the width of the more expensive secondary filters without undermining the compressive strength used for constraining and setting the stacked thickness of the graphene oxide layers.

Figure 3:
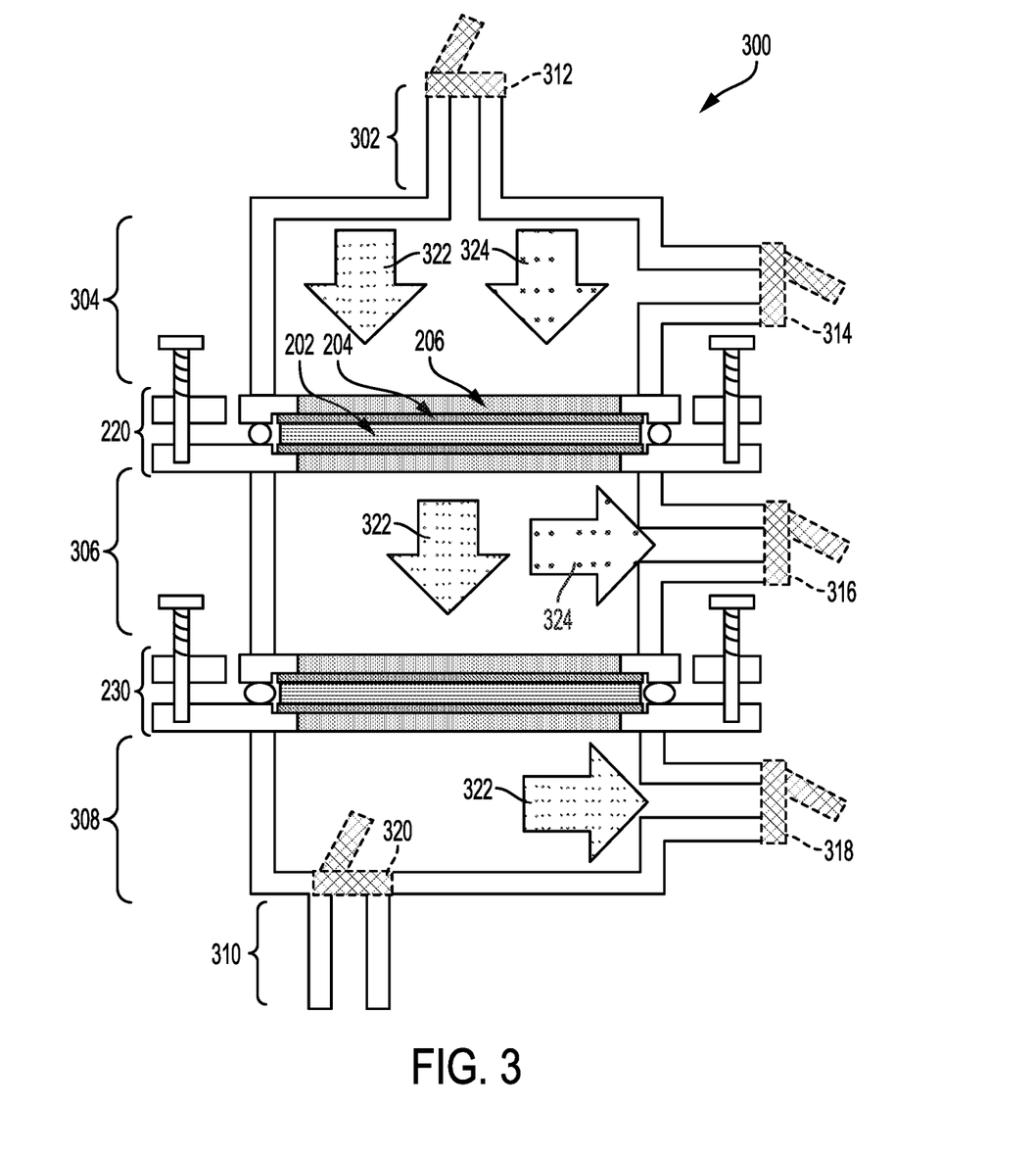
FIG. 3 is a cross-sectional side view of an example nanofiltration system using multiple graphene oxide nanofilters with adjustable filtration cutoffs, in accordance with certain embodiments of the disclosed technology.

FIG. 3 illustrates a nanofiltration module or assembly 300 that includes multiple adjustable graphene oxide nanofilters for various filtration systems and/or applications. A first nanofilter 220 may be arranged upstream of a second nanofilter 230 in the nanofiltration module 300. This serial arrangement of the first nanofilter 220 and second nanofilter 230 may enable modular multilayer filtration and/or simultaneous separation of multiple molecular sizes. The adjusted separation distance within the first nanofilter 220 may be larger than the adjusted separation distance in the second nanofilter 230. At an entry stage 302 in the nanofiltration module 300, an entry valve 312 may control the flow of a feed fluid that includes smaller-sized molecules 322 and medium-sized molecules 324 as well as larger-sized molecules (not shown). A first stage 304 of the nanofiltration module 300 includes an outlet valve 314 for controlling the flow of larger, medium, and smaller molecules from the nanofiltration module 300 as well as regulating the pressure of the feed fluid in the first stage 304. The first nanofilter 220 separates the first stage 304 from a second stage 306 in the nanofiltration module 300 and prevents the larger molecules from entering the second stage 306, while allowing permeation of the smaller-sized molecules 322 and the medium-sized molecules 324. The second stage 306 may include an outlet valve 316 for controlling the flow of smaller-sized molecules 322 and medium-sized molecules 324 from the nanofiltration module 300. The second nanofilter 230 separates the second stage 306 from a third stage 308 in the nanofiltration module 300 and prevents the medium-sized molecules 324 from entering the third stage 308, while allowing permeation of the smaller-sized molecules 322. The third stage 308 may include an outlet valve 318 for controlling the flow of smaller-sized molecules 322 from the nanofiltration module 300. Further, the nanofiltration module 300 may include an exit valve 320 at an exit stage 310 of the nanofiltration module 300 for controlling the flow of smaller-sized molecules 322 from the nanofiltration module 300 as well as regulating the pressure of the feed fluid and filtrates in the entire nanofiltration module 300.

Figure 4:
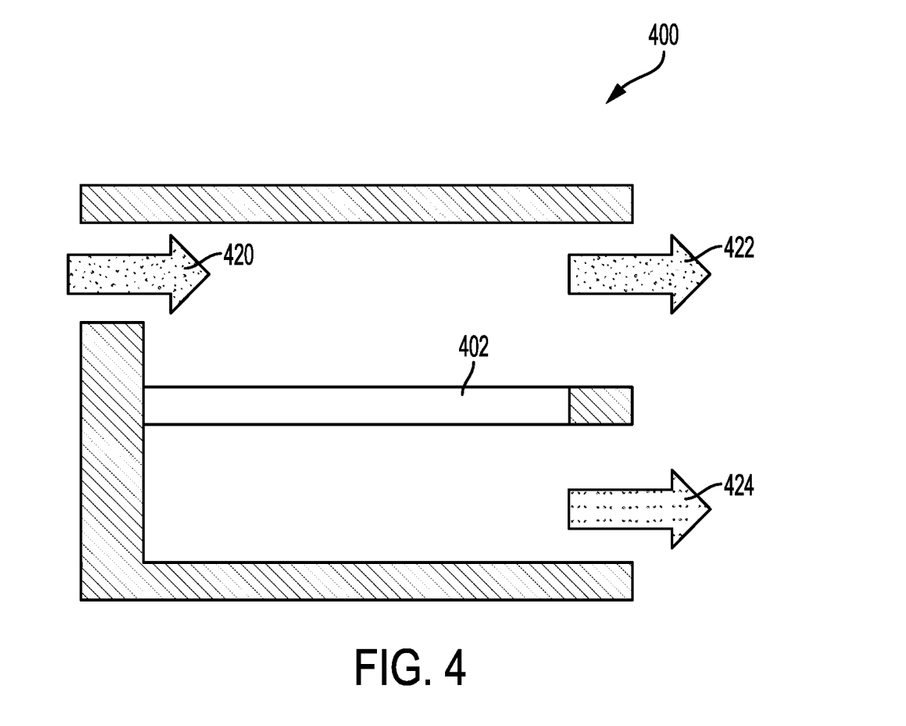
FIG. 4 is a cross-sectional side view of an example nanofiltration system using tangential flow, in accordance with certain embodiments of the disclosed technology.

FIG. 4 illustrates a nanofiltration system 400 with tangential flow filtration across an adjustable graphene oxide nanofilter 402. Within the tangential flow arrangement of the nanofiltration system 400, a feed fluid 420, including larger-sized molecules and medium-sized molecules, flows into the nanofiltration system 400. The separation distance of the adjustable graphene oxide nanofilter 402 may be set such that the filtration cutoff is lower than the effective hydrated radius of the larger-sized molecules. Thus, due to permeation of the medium-sized molecules through the adjustable graphene oxide nanofilter 402, an exiting fluid 422 may have a lower concentration of medium-sized molecules compared to the entering feed fluid 420, and a filtrate fluid 424 may include medium-sized molecules without any larger-sized molecules. The concentration of the filtrate fluid 424 may be adjusted by altering the concentration and/or pressure of the feed fluid 420.

Figure 5:
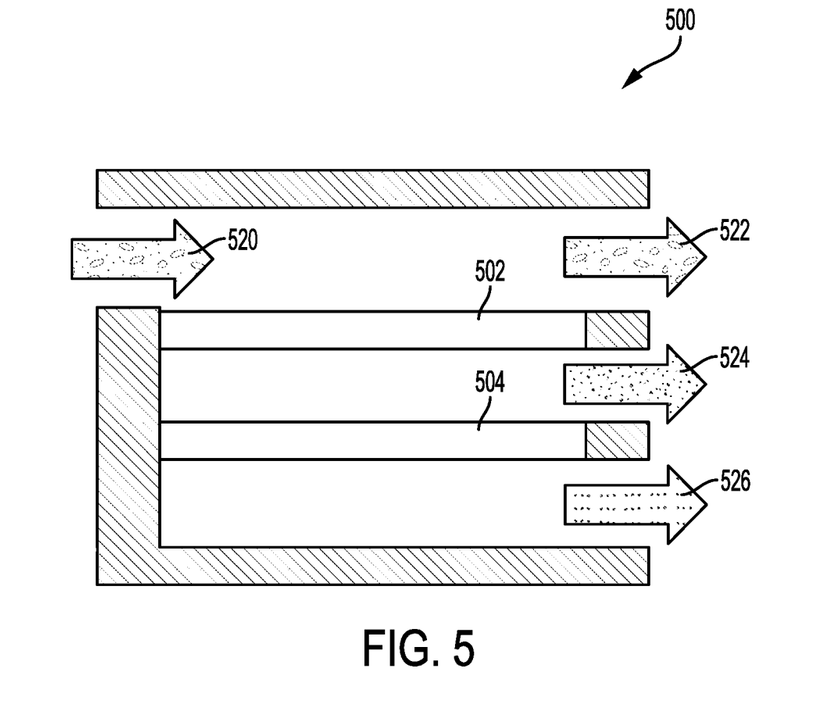
FIG. 5 is a cross-sectional side view of an example nanofiltration system using multiple graphene oxide nanofilters and tangential flow paths, in accordance with certain embodiments of the disclosed technology.

FIG. 5 illustrates a nanofiltration system 500 with tangential flow filtration across multiple adjustable graphene oxide nanofilters 502 and 504. Within the tangential flow arrangement of the nanofiltration system 500, a feed fluid 520, including larger-sized molecules, medium-sized molecules, and smaller-sized molecules, flows into the nanofiltration system 500. The separation distance of the adjustable graphene oxide nanofilter 502 may be set such that the filtration cutoff is lower than the effective hydrated radius of the larger-sized molecules. Thus, due to permeation of the medium-sized molecules and the smaller-sized molecules through the adjustable graphene oxide nanofilter 502, an exiting fluid 522 may have a lower concentration of both medium-sized molecules and smaller-sized molecules compared to the entering feed fluid 520, and a filtrate fluid 524 may include medium-sized molecules and smaller-sized molecules without any larger-sized molecules. Further, the separation distance of the adjustable graphene oxide nanofilter 504 may be set such that the filtration cutoff is lower than the effective hydrated radius of the medium-sized molecules. Thus, due to permeation of the smaller-sized molecules through the adjustable graphene oxide nanofilter 504, a filtrate fluid 526 may include smaller-sized molecules without any medium-sized molecules or larger-sized molecules. The concentrations of the filtrate fluids 524 and 526 may be adjusted by altering the concentration and/or pressure of the feed fluid 520.

Figure 6:
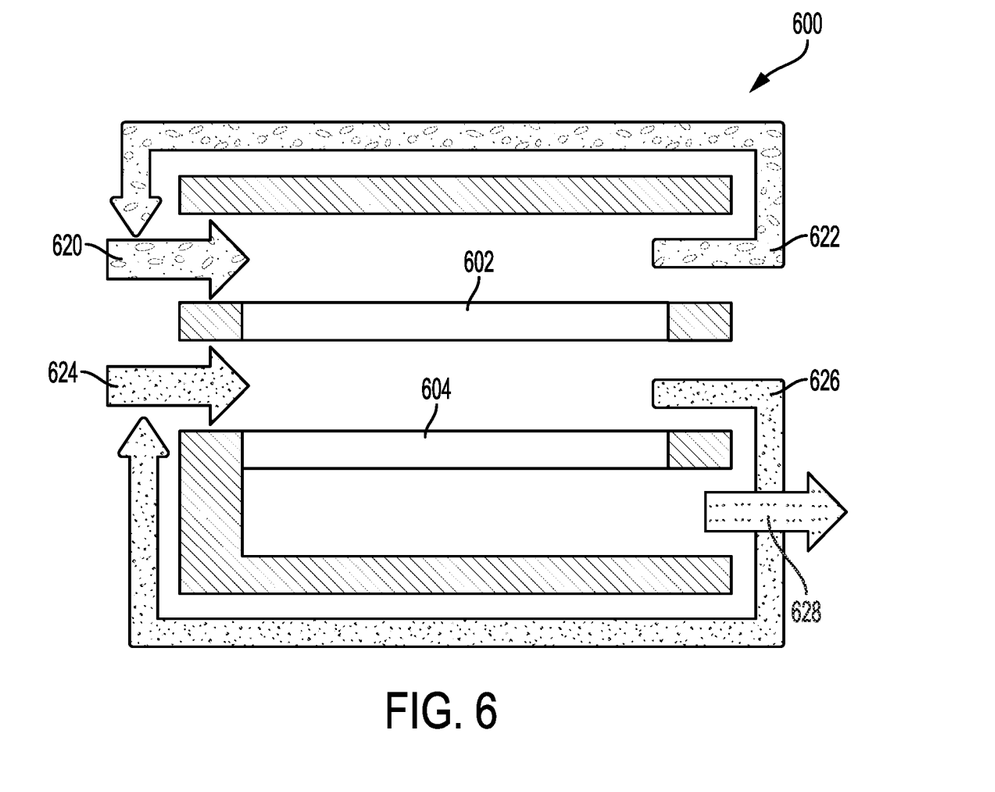
FIG. 6 is a cross-sectional side view of an example nanofiltration system using tangential flow and recirculation, in accordance with certain embodiments of the disclosed technology.

FIG. 6 illustrates a nanofiltration system 600 similar to the nanofiltration system 500 of FIG. 5, but further including recirculation loops. Within the tangential flow arrangement of the nanofiltration system 600, a feed fluid 620, including larger-sized molecules, medium-sized molecules, and smaller-sized molecules, flows into the nanofiltration system 600. The separation distance of an adjustable graphene oxide nanofilter 602 may be set such that the filtration cutoff is lower than the effective hydrated radius of the larger-sized molecules. Thus, due to permeation of the medium-sized molecules and the smaller-sized molecules through the adjustable graphene oxide nanofilter 602, an exiting fluid 622 may have a lower concentration of both medium-sized molecules and smaller-sized molecules compared to the entering feed fluid 620, and a filtrate fluid 626 may include medium-sized molecules and smaller-sized molecules without any larger-sized molecules. Further, the exiting fluid 622 is recirculated and input back into the nanofiltration system 600 with the feed fluid 620. The flow rate of the recirculation loop of the exiting fluid 622 may be set and/or adjusted based on a desired constant concentration level and/or flow rate of the mixed fluids entering the nanofiltration system 600 in a continuous operation mode. Alternatively, the nanofiltration system 600 may be operated in a batch mode where, after an initial introduction of a fixed volume of the feed fluid 629, the exiting fluid 622 is recirculated through the nanofiltration system 600 until a desired concentration and/or volume of the filtrate fluid 626 is reached. Moreover, the separation distance of the adjustable graphene oxide nanofilter 604 may be set such that the filtration cutoff is lower than the effective hydrated radius of the medium-sized molecules. Thus, due to permeation of the smaller-sized molecules through the adjustable graphene oxide nanofilter 604, a filtrate fluid 628 may include smaller-sized molecules without any medium-sized molecules or larger-sized molecules. Similar to the recirculation loop of the exiting fluid 622, the filtrate fluid 626 may be recirculated into the nanofiltration system 600 between the adjustable graphene oxide nanofilters 602 and 604. The recirculation loop for the filtrate fluid 626 may be continuously run at a set flow rate correlated with the continuous-mode flow operation of the feed fluid 620, or may be recirculated until a desired concentration and/or volume of the filtrate fluid 628 is reached in the batch-mode operation.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A nanofilter comprising:
a first porous support plate;
a second porous support plate;
graphene oxide layers deposited between the first and the second porous support plates, wherein the graphene oxide layers have pore sizes different than pore sizes in the first and second support plates;
an adjusting control to allow adjustment and to set at least one of pressure and distance between the first and second porous plates to compress and constrain the graphene oxide layers at a set position, the at least one of the pressure and the distance set based upon a desired filtration cutoff; and
a programmable controller connected to the adjusting control, the controller configured to provide the adjustment to the adjusting control based upon programmed filtration cutoff states mapped to a separate distance set by the adjusting control.

2. The nanofilter of claim 1, further comprising:
a seal arranged between the first and second porous plates and surrounding the graphene oxide layers.

3. The nanofilter of claim 1, further comprising:
a first porous substrate filter between the graphene oxide layers and the first porous plate; and
a second porous substrate filter between the graphene oxide and the second porous plate.

4. The nanofilter of claim 1, further comprising:
a support frame;
a first flow channel arranged upstream of the first porous plate; and
a second flow channel arranged downstream of the second porous plate.

5. The nanofilter of claim 1, wherein the adjusting control is remotely operable.

6. The nanofilter of claim 1, wherein the distance between the first and second porous plates is mapped against an interlayer gap size of the graphene oxide layers.

7. A nanofiltration system comprising:
a filter including:
a first porous support plate;
a second porous support plate;
graphene oxide layers deposited between the first and the second porous support plates, wherein the graphene oxide layers have pore sizes different than the first and second support plates; and
an adjusting control to allow adjustment and to set at least one of pressure and distance between the first and second porous plates to compress and constrain the graphene oxide layers, the at least one of the pressure and the distance based upon a desired filtration cutoff;
a programmable controller connected to the adjusting control, the controller configured to provide the adjustment to the adjusting control based upon programmed filtration cutoff states mapped to a separate distance set by the adjusting control; and
a flow channel arranged tangentially to the filter.

8. The nanofiltration system of claim 7, wherein the adjusting control includes a fine pitch screw.

9. The nanofiltration system of claim 7, wherein the adjusting control includes an inch worm piezo element.

10. The nanofiltration system of claim 7, wherein the adjusting control includes a spring mount.

11. The nanofiltration system of claim 7, wherein the adjusting control includes a pneumatic element.

12. The nanofiltration system of claim 7, further comprising:
a second filter; and
a second flow channel arranged tangentially to the second filter.

* * * * *